US012791886B2

(12) United States Patent
Hengesbach et al.

(10) Patent No.: US 12,791,886 B2
(45) Date of Patent: Nov. 10, 2026

(54) ELECTRO-OPTICAL MODULATED PHASE ACTUATOR

(71) Applicant: QuiX Quantum B.V., Enschede (NL)

(72) Inventors: Stefan Hengesbach, Stuttgart (DE); Jörn Epping, Munster (DE); Michiel De Goede, Enschede (NL); Pavel Stremoukhov, Deventer (NL)

(73) Assignee: QuiX Quantum B.V., Enschede (NL)

( * ) Notice: Subject to any disclaimer, the term of this patent is extended or adjusted under 35 U.S.C. 154(b) by 522 days.

(21) Appl. No.: 18/238,159

(22) Filed: Aug. 25, 2023

(65) Prior Publication Data

US 2024/0319525 A1 Sep. 26, 2024

(30) Foreign Application Priority Data

Mar. 22, 2023 (EP) .................................... 23163401

(51) Int. Cl.
*G02F 1/035* (2006.01)
*G02F 1/03* (2006.01)

(52) U.S. Cl.
CPC ............ *G02F 1/035* (2013.01); *G02F 1/0316* (2013.01); *G02F 2201/063* (2013.01)

(58) Field of Classification Search
CPC ........ G02F 1/035; G02F 1/0356; G02F 1/225; G02F 1/2255; G02F 2201/063
USPC ......................................................... 385/1-3
See application file for complete search history.

(56) References Cited

U.S. PATENT DOCUMENTS 7,146,087 B2 12/2006 Heideman et al.
7,224,878 B1 * 5/2007 Wessels ................ G02F 1/0356 385/2
11,754,865 B2 * 9/2023 Soltani ............... G02B 6/12002 385/2
2002/0167983 A1 11/2002 Marutani et al.
2005/0152660 A1 7/2005 Heidman et al.
2006/0222281 A1 * 10/2006 Deliwala ................. G02F 1/011 385/39

(Continued)

FOREIGN PATENT DOCUMENTS

JP H07220694 A 8/1995

OTHER PUBLICATIONS

"Preferential growth of perovskite BaTiO3 thin films on Gd3Ga5012(100) and Y3Fe5O12(100) oriented substrates by pulsed laser deposition" by Ruf et al., Mater. Adv., vol. 3, pp. 4920-4931 (Year: 2022).*

(Continued)

*Primary Examiner* — Robert Tavlykaev

(74) *Attorney, Agent, or Firm* — Polsinelli PC; Gregory P. Durbin

(57) ABSTRACT

A phase actuator is described. The phase actuator comprises an optical waveguide wherein the optical waveguide comprises at least one strip of silicon nitride embedded in a layer of silicon dioxide; a strip of material on or in the optical waveguide wherein the strip of material comprise a material is electro-optically active and acts as an electro-optical modulator; a signal electrode in contact with a first surface of the strip of material; and a ground electrode separated from the signal electrode wherein the signal electrode and the ground electrode are positioned to allow a travelling electrical-magnetic wave to propagate over the length of the phase actuator.

18 Claims, 3 Drawing Sheets

(56) References Cited

U.S. PATENT DOCUMENTS

| | | | | |
|---|---|---|---|---|
| 2010/0111762 | A1 | 5/2010 | Cho | |
| 2017/0299811 | A1 | 10/2017 | Wessels et al. | |
| 2021/0048721 | A1 | 2/2021 | Wang | |
| 2023/0055077 | A1* | 2/2023 | Shi | G02F 1/0151 |
| 2023/0152608 | A1* | 5/2023 | Heideman | G02B 6/122 385/3 |
| 2023/0152611 | A1* | 5/2023 | Thompson | C23C 14/08 385/2 |
| 2023/0234310 | A1* | 7/2023 | Janiak | B29D 11/00663 385/2 |
| 2023/0296837 | A1* | 9/2023 | Raval | G02B 6/1223 385/131 |

OTHER PUBLICATIONS

"The Silicon-Based XOI Wafer: The Most General Electronics-Photonics Platform for Computing, Sensing, and Communications" by Soref et al., IEEE Journal of Selected Topics in Quantum Electronics, vol. 29, No. 2, paper 8200108 (Year: 2022).*

"216 GBd Plasmonic Ferroelectric Modulator Monolithically Integrated on Silicon Nitride" by Kohli et al., European Conference on Optical Communication, paper Tu4E.5 (Year: 2022).*

Abel, S. et al., A hybrid barium titanate-silicon photonics platform for ultraefficient electro-optic tuning, Journal of Lightwave Technology, 34(8):1688-1693, 2016 (6 pages).

Abel, S. et al., Large Pockels effect in micro-and nanostructured barium titanate integrated on silicon, Nature Materials, 18(1):42-47, 2019 (7 pages).

Chang, L. et al., Heterogeneous integration of lithium niobate and silicon nitride waveguides for wafer-scale photonic integrated circuits on silicon, Optical Society of America, Optics Letters, 42(4):803-806, 2017 (4 pages).

Chen, B. et al., Signatures of enhanced out-of-plane polarization in asymmetric BaTiO3 superlattices integrated on silicon, Nature Communications, 13:265, 2022 (8 pages).

Dong, M. et al., Piezo-optomechanical cantilever modulators for VLSI visible photonics, APL Photonics 7(051304), 2022 (8 pages).

Eltes, F. et al., An integrated optical modulator operating at cryogenic temperatures, Nature Materials, 19:1164-1168, 2020 (6 pages).

Everhardt, A. S. et al., Ultra-low power stress-based phase actuation in TriPleX photonic circuits, Proc. SPIE, Integrated Optics: Devices, Materials, and Technologies XXVI, 12004(1200405-1), 2022 (7 pages).

Ortmann, J. E. et al., Ultra-low-power tuning in hybrid barium titanate-silicon nitride electro-optic devices on silicon, ACS Photonics, 6(11):2677-2684, 2019 (8 pages).

Roeloffzen, C. G. H. et al., Low-loss SisN4 TripleX optical waveguides: Technology and applications overview, IEEE Journal of Selected Topics in Quantum Electronics, 24(4):1-21, 2018 (21 pages).

Rosa, A. et al., Barium titanate (BaTiO 3) RF characterization for application in electro- optic modulators, Optical Materials Express, 7(12):4328-4336, 2017 (9 pages).

Wörhoff, K. et al., TriPleX: a versatile dielectric photonic platform, Advanced Optical Technologies, 4(2):189-207, 2015 (19 pages).

* cited by examiner

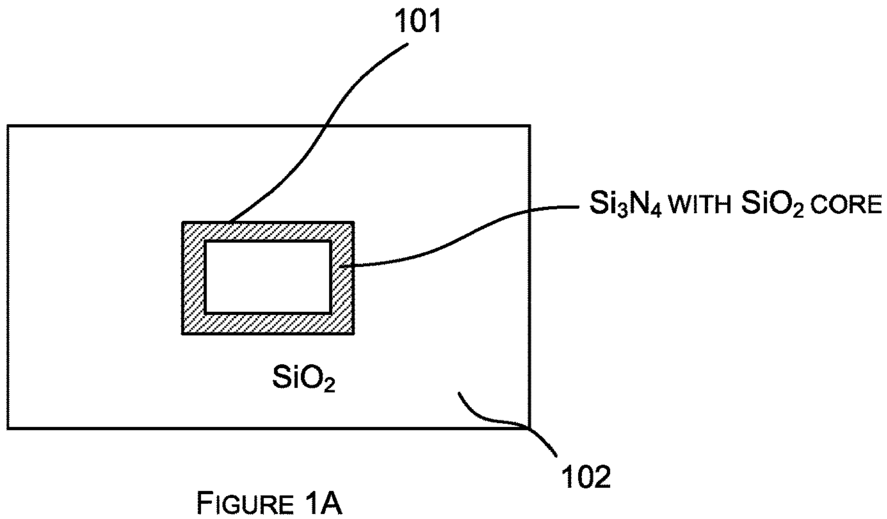
FIGURE 1A
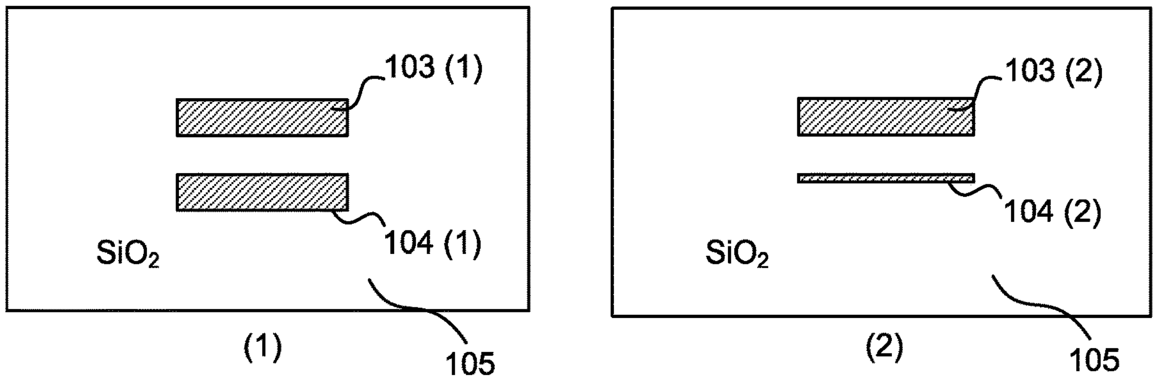
FIGURE 1B
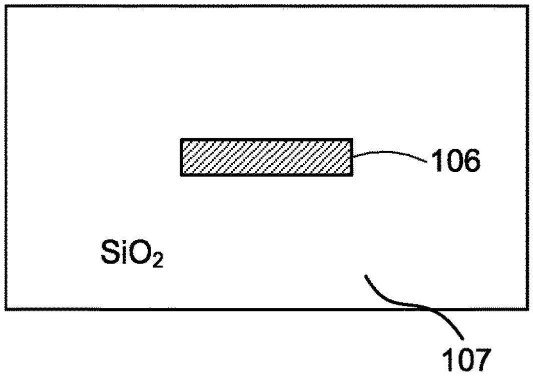
FIGURE 1C
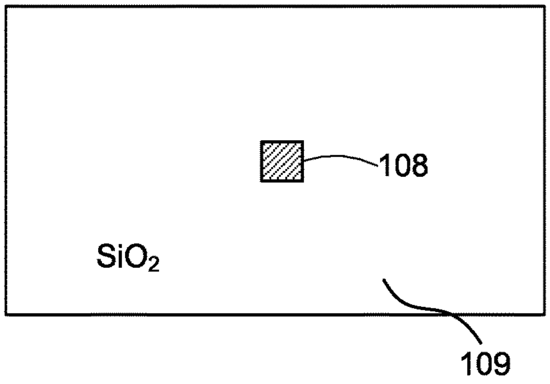
FIGURE 1D
FIG. 1

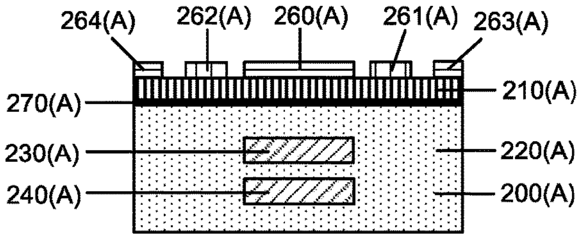
FIGURE 2A
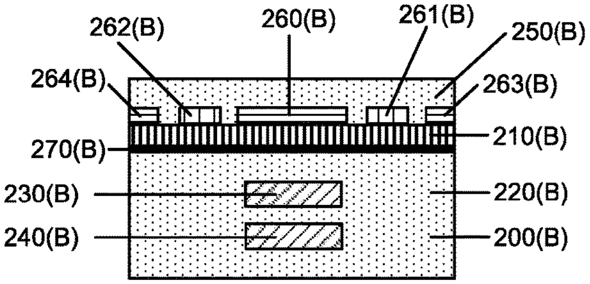
FIGURE 2B
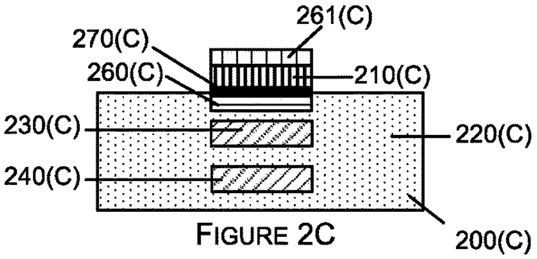
FIGURE 2C
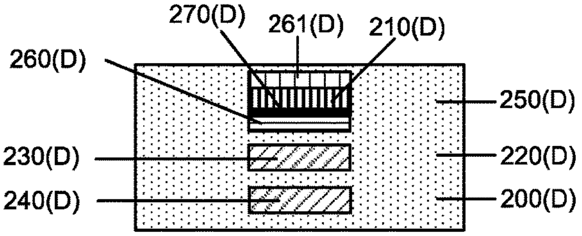
FIGURE 2D
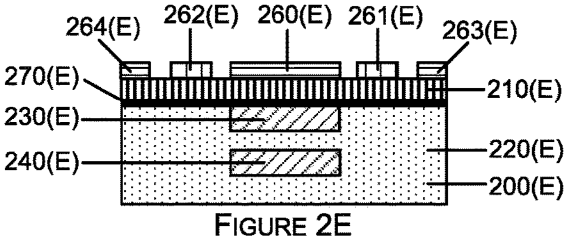
FIGURE 2E
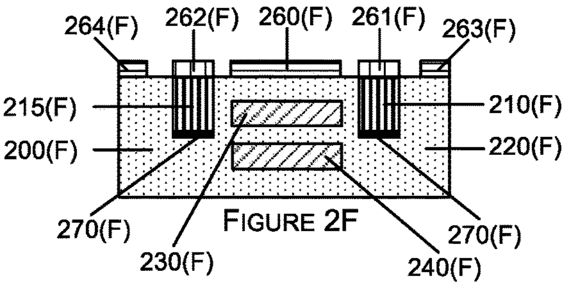
FIGURE 2F
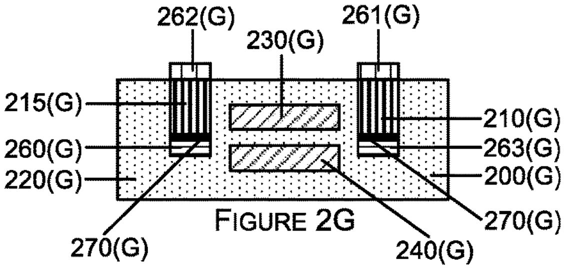
FIGURE 2G
FIGURES:
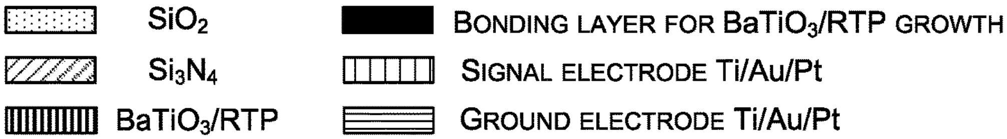

ELECTRO-OPTICAL MODULATED PHASE ACTUATOR

CROSS-REFERENCE TO RELATED APPLICATION

This application is related to and claims priority from European Patent Application No. 23163401.5 filed Mar. 22, 2023, the entire contents of which is incorporated herein by reference for all purposes.

BACKGROUND

Phase actuators have multiple uses as phase shifters, in multiplexers, in beam sources and in quantum processors for photonic quantum computing. In particular, in photonic quantum computing and communication, quantum information is encoded into photon states which are then controlled using phase actuators to implement quantum operations. While a class of waveguides, known as TriPlex waveguides, are known to have low optical losses, making them suitable for quantum computing applications, these waveguides are not electro-optically active so are limited to forming phase actuators of the thermal, piezo or MEMS (microelectromechanical) type. However, all these forms of phase actuators have a low reconfiguration rate. In addition, there is no scalable fabrication technology for MEMS phase actuators which have a low fabrication yield. Piezo-electric phase actuators have a relatively high driving voltage and a large footprint. Meanwhile, thermal phase actuators have a large footprint, large crosstalk, large power consumption and are often not cryogenically compatible with the waveguides. Hence, it would be desirable to form an alternative phase actuator that maintains the advantages of low loss associated with TriPlex waveguides while avoiding the disadvantages of thermal, piezo and MEMS type phase actuators.

The embodiments described below are not limited to implementations which solve any or all of the disadvantages of known phase actuators and known phase actuators formed from TriPlex waveguides.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A first aspect provides a phase actuator comprising: an optical waveguide wherein the optical waveguide comprises at least one strip of silicon nitride embedded in a layer of silicon dioxide; a strip of material on or in the optical waveguide wherein the strip of material comprise a material that is electro-optically active and acts as an electro-optical modulator; a signal electrode in contact with a first surface of the strip of material; and a ground electrode separated from the signal electrode wherein the signal electrode and the ground electrode are positioned to allow a travelling electrical-magnetic wave to propagate over the length of the phase actuator. Silicon nitride in silicon dioxide waveguides can be useful since they tend to have relatively low optical losses. However, they are non-electro-optically active. This means they are not generally used as electro-optically modulated phase actuators. By providing a layer of an electro-optically active material on a waveguide formed from silicon nitride embedded in silicon dioxide, it is possible to make the formerly non-electro-optically active silicon nitride/silicon dioxide waveguide electro-optically active. This enables it to be used as an electro-optically modulated phase actuators. These phase actuators often have a smaller footprint and a lower operating voltage than thermal, piezo-electric, or MEMS.

In some examples, the strip of material comprises a strip of Barium Titanate or a strip of Rubidium Titanyl Phosphate. Barium Titanate and Rubidium Titanyl Phosphate have a relative high dielectric constant, low tangent losses, and high Pockels coefficient meaning they form efficient electro-optically modulators. In addition, both materials are relatively easy to fabricate on silicon dioxide as both Barium Titanate and Rubidium Titanyl Phosphate are compatible with silicon dioxide. Using Barium Titanate or Rubidium Titanyl Phosphate therefore provides an efficient phase actuator that is relatively easy to form.

In some examples, the waveguide is a TriPlex waveguide. The TriPlex class of waveguides are a form of silicon nitride/silicon dioxide waveguide with relatively low optical losses. This means they can be used to form a relatively low loss phase actuator.

In some examples, the at least one strip of silicon nitride comprises a first and second strip of silicon nitride embedded in the layer of silicon dioxide; the first and second strip of silicon nitride are of the same length as each other and do not extend across the entire length of the layer of silicon dioxide; and the first and second strip of silicon nitride are separated from each other by the layer of silicon dioxide and are aligned with each other. Thus, the waveguide can be a double stripe form of TriPlex waveguide. As mentioned above, TriPlex waveguides have relatively low optical losses meaning any phase actuator formed from such a waveguide has a relatively low optical loss.

In some examples, the phase actuator further comprises a bonding layer between the optical waveguide and the strip of material wherein the bonding layer comprises $SrTiO_3$, $Gd_3Ga_5O_{12}$, $Y_3Fe_5O_{12}$. The use of a bonding layer of these materials enables electro-optically active materials such as Barium Titanate and Rubidium Titanyl Phosphate to be grown on the silicon dioxide or silicon nitride preventing the need for the Barium Titanate or Rubidium Titanyl Phosphate to be fabricated separately and bonded to the silicon dioxide or silicon nitride. This improves the quality of the connection between the Barium Titanate or Rubidium Titanyl Phosphate and the silicon dioxide or silicon nitride. This also increases the ease of fabricating the phase actuator.

In some examples, the strip of material is on a surface of the optical waveguide such that a second surface of the strip of material interfaces with the optical waveguide, wherein the first and second surface of the strip of material are opposing surfaces; and the signal electrode and the ground electrode are on the second surface of the strip of material. Having the strip of material be on the surface of the optical waveguide enables easy fabrication since the strip of material can be grown on the waveguide without requiring any additional modification of the waveguide. In these examples, in some cases, the surface of the optical waveguide comprises a surface of the layer of silicon dioxide. This provides a separation between the silicon nitride and the strip of material. This reduces the fraction of the mode of light in the silicon nitride that enters the strip of material and thus reduces optical losses at the expense of efficiency of the electro-optical modulation of the phase actuator. In other cases of these examples, the surface of the optical waveguide comprises at least a surface of one of the at least one strips of silicon nitride; and optionally the surface of the optical waveguide extends to include a surface of the layer of silicon dioxide. This reduces the separation between the silicon nitride and the strip of material. This results in a higher fraction of the mode of light in the silicon nitride entering the strip of material. This provides an improved electro-optical modulation efficiency at the expense of higher optical losses. The skilled person can choose the separation between the silicon nitride and the strip of material to trade off electro-optical modulation efficiency and optical losses dependent on the purpose of the phase actuator.

When the strip of material is on the surface of the optical waveguide, the phase actuator can further comprise a second layer of silicon dioxide on the second surface of the strip of material. This second layer of silicon dioxide can be referred to as top or cover layer of silicon dioxide and can reduce optical losses and simplify the RF (radio frequency) design enabling a more flexible arrangement of electrodes.

In some examples, the ground electrode is in contract with a second surface of the strip of material, wherein the first and second surface of the strip of material are opposing surfaces. This enables the phase shifter to take the form of a capacitor which can be a useful form of phase shifter because it is a known type of electrical load in the integrated circuit industry that can simplify control of highly integrated phase shifter arrays and thus be useful when the phase shifter is used for photonic quantum computing. In some examples the ground electrode, strip of material, and signal electrode are embedded in the layer of silicon dioxide. This can reduce optical losses and simplify the RF design hence enabling a more flexible arrangement of electrodes. In other examples, the ground electrode is embedded in the layer of silicon dioxide, and the strip of material and signal electrode are on a surface of the silicon dioxide layer. This can increase the ease of forming the phase actuator.

In some examples, the signal electrode, the strip of material and the ground electrode extend along only part of the layer of silicon dioxide. This can make it easier to fabricate the electrodes. In addition, varying the length of the strip of material enables control over the fraction of a mode of light in the waveguide that couples to the strip of material as the longer the strip of material the greater the fraction of the mode of light that couples. This enables electro-optical efficiency, which occurs when more light is coupled, to be traded off against optical losses, which also occur when more light is coupled.

In some examples, the strip of material comprises a first strip of material, and the phase actuator further comprises: a second strip of material wherein the second strip of material comprise an electro-optical modulator; and a second signal electrode in contract with a first surface of the second strip of material; wherein: the first strip of material is embedded in the layer of silicon dioxide on a first side of the at least one strip of silicon nitride; and the second strip of material is embedded in the layer of silicon dioxide on a second side of the at least one strip of silicon nitride wherein the first side and the second side of the at least one strip of silicon nitride are opposite sides of the at least one strip of silicon nitride. This arrangement is a geometrically promising configuration in terms of Pockels effect efficiency. In some cases of these examples, the ground electrode is a first ground electrode; the first ground electrode is in contact with a second surface of the first strip of material, wherein the first surface and second surface of the strip of material are opposing surfaces; and the phase actuator further comprises: a second ground electrode wherein the second ground electrode is in contact with a second surface of the second strip of material, wherein the first surface and second surface of the strip of material are opposing surfaces. This enables both strips of material to take the form of a capacitor. In other cases of these examples, the ground electrode is in contact with a surface of the silicon dioxide layer. This provides a relatively easy way of forming the electrodes.

A second aspect provides a method of forming a phase actuator comprising: forming an optical waveguide by forming at least one strip of silicon nitride embedded in a silicon dioxide layer; forming a bonding layer on at least one surface of the optical waveguide wherein the bonding layer comprises at least one of $SrTiO_3$, $Gd_3Ga_5O_{12}$, or $Y_3Fe_5O_{12}$; growing using epitaxial growth a strip of Barium Titanate or Rubidium Titanyl Phosphate on the bonding layer; forming a signal electrode on a first surface of the strip of Barium Titanate or Rubidium Titanyl Phosphate; and forming a ground electrode on one of a first surface of the strip of Barium Titanate or Rubidium Titanyl Phosphate, a second surface of the strip of Barium Titanate or Rubidium Titanyl Phosphate, or on or in the silicon dioxide layer wherein the first and second surface of the strip of Barium Titanate or Rubidium Titanyl Phosphate are opposing surfaces. This provides a method of forming a phase actuator in accordance with the above examples.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which:

FIG. 1 is a diagram showing various arrangements of TriPlex waveguides;

FIG. 1A shows a box shell structure of TriPlex;

FIG. 1B shows a double-stripe structure of TriPlex;

FIG. 1C shows a single stripe structure of TriPlex; and

FIG. 1D shows a filled box structure of TriPlex;

FIG. 2 is a diagram showing various arrangements of a phase actuator formed of double-stripe TriPlex and Barium Titanate or Rubidium Titanyl Phosphate;

FIG. 2A shows an open extended strip of Barium Titanate or Rubidium Titanyl Phosphate formed on the silicon dioxide layer/cladding of the TriPlex;

FIG. 2B shows an extended strip of Barium Titanate or Rubidium Titanyl Phosphate formed on the silicon dioxide layer/cladding of the TriPlex and covered by a silicon dioxide cover layer;

FIG. 2C shows an open shortened strip of Barium Titanate or Rubidium Titanyl Phosphate formed on the silicon dioxide layer/cladding of the TriPlex;

FIG. 2D shows a shorted strip of Barium Titanate or Rubidium Titanyl Phosphate formed on the silicon dioxide layer/cladding of the TriPlex and covered by a silicon dioxide cover layer;

FIG. 2E shows an open shorted strip of Barium Titanate or Rubidium Titanyl Phosphate formed on a strip of silicon nitride of the TriPlex;

FIG. 2F shows two strips of Barium Titanate or Rubidium Titanyl Phosphate embedded in the silicon dioxide layer/cladding of the TriPlex, the two strips of Barium Titanate or Rubidium Titanyl Phosphate are positioned on either side of the strips of silicon nitride, ground electrodes are formed on the silicon dioxide layer/cladding;

FIG. 2G shows two strips of Barium Titanate or Rubidium Titanyl Phosphate embedded in the silicon dioxide layer/ cladding of the TriPlex, the two strips of Barium Titanate or Rubidium Titanyl Phosphate are positioned on either side of the strips of silicon nitride, ground electrodes are formed on the strips of Barium Titanate or Rubidium Titanyl Phosphate.

Figure 3:
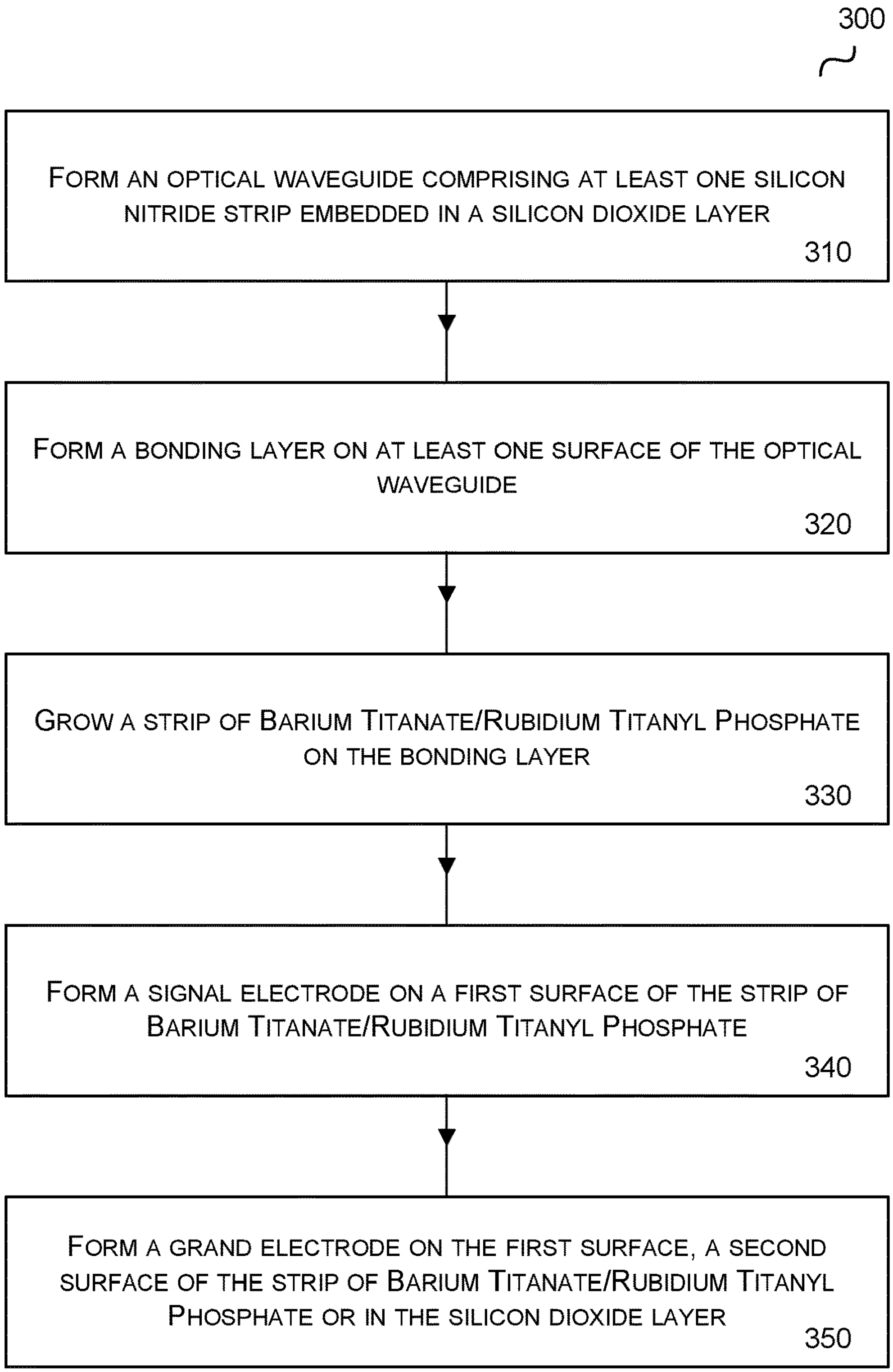
FIG. 3 shows an example method for forming a phase actuator in accordance with the examples in FIG. 2 above.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

The application relates to a phase actuator in a waveguide formed from at least one silicon nitride strip embedded in a silicon dioxide layer ($SiO_2$). The silicon dioxide layer can also be known as a silicon dioxide cladding. Waveguides of this form can be referred to as TriPlex waveguides. In at least some examples, at least one silicon nitride strip can be a strip of $Si_3N_4$. $Si_3N_4$ is used because it is a thermally dynamically stable form of silicon nitride. A strip or layer of material is formed in or on the waveguide wherein the layer of material is electro-optically active and hence the layer of material is an electro-optic modulator. Examples of materials which can be used include Barium Titanate ($BaTiO_3$) and Rubidium Titanyl Phosphate ($RbTiOPO_4$/RTP). The inclusion of the strip or layer of electro-optically active material enables the creation of birefringence via an externally applied electric field. This leads to a phase change of light propagating in the waveguide and hence enables the waveguide to act as a phase actuator. The use of a strip or layer of electro-optically active material enables the waveguide to be an electro-optically modulated phase actuator. Such electro-optically modulated phase actuators provide high-scale on-chip integration, cryogenic compatibility, and lower driving voltages than piezo-electric or thermal phase actuators and a smaller footprint than thermal phase actuators. They are also easier to fabricate than MEMS (microelectromechanical) phase actuators. In some examples, the strip or layer of material is a strip or layer of Barium Titanate or Rubidium Titanyl Phosphate. These materials have a relative high dielectric constant, low tangent losses, and high Pockels and piezoelectric coefficients meaning they can be used to form efficient phase actuators.

Waveguides formed of silicon nitride in a silicon dioxide layer/cladding have relatively low optical losses. For example, waveguides of this form have been demonstrated which have optical losses down to $5\times10^{-4}$ dB/cm which is among the lowest known for an integrated photonic material platform. This is advantageous for applications such as quantum computing and switching where optical losses are particular undesirable as information is lost. However, neither silicon nitride nor silicon dioxide are electro-optically active. This means that when phase actuators are formed using such waveguides, the phase actuators have to be of the thermal, piezo-electric, or MEMS (microelectromechanical) type. Typically, due to the difficulties with forming piezo-electric and MEMS phase actuators and limits on the surrounding materials, thermal phase actuators are used. However, such phase actuators have a low reconfiguration rate, large footprint, large crosstalk, large power consumption and are not cryogenically compatible with the waveguides due to their need for heating which makes it difficult to place them in a device cryostat. When the waveguides are being used to form phase actuators for quantum computing, this limits the size of quantum circuit that can be implemented. In addition, when the waveguides are being used for phase actuators for switching, this limits the speed and accuracy of the switching. Therefore, while silicon nitride in silicon dioxide waveguides have desirable properties, it would be beneficial to provide an improved way of adapting them to form an improved phase actuator.

In the present application, the silicon nitride/silicon dioxide waveguide is provided with at least one strip of Barium Titanate or Rubidium Titanyl Phosphate that is either positioned on or formed in the waveguide. As Barium Titanate and Rubidium Titanyl Phosphate are electro-optically active, this enables the waveguide to be used as an electro-optic phase actuator. Barium Titanate or Rubidium Titanyl Phosphate is used because these materials have a relative high dielectric constant, low tangent losses, and high Pockels and piezoelectric coefficients. In addition, silicon dioxide and Barium Titanate and silicon dioxide and Rubidium Titanyl Phosphate are compatible materials enabling the Barium Titanate or Rubidium Titanyl Phosphate to be grown on the silicon dioxide with the aid of a bonding layer. This is in contrast to other electro-optically materials such as Lithium Niobate which need to be formed separately and then bonded to the silicon nitride/silicon dioxide waveguide, something which reduces ease of fabrication and potentially, the quality and stability of the finalized phase actuator. Barium Titanate or Rubidium Titanyl Phosphate are also beneficial since in operating mode they typically requires 2 to 4V to create or alter the birefringence needed to change the phase of the light propagation in the waveguide by a pi ($\pi$) phase shift. This means the resultant phase actuator is relatively fast, has relatively low driving voltages and is cryogenically compatible with the silicon nitride/silicon dioxide waveguide. Other electro-optically active materials, such as Lithium Niobate, require a higher voltage of around 15V to 30V in use. Barium Titanate or Rubidium Titanyl Phosphate also have the advantage that the crystal orientation can be reset using a voltage of around 20V. When phase actuators are being used in commercial applications, such as quantum computing and light switching, it can become necessary to reorient the crystal orientation due to drift. This prevents the phase actuator from becoming less effective and accurate over time. A reset voltage of around 20V means this process can be performed without harming other components of the system. In contrast, other electro-optically active materials, such as Lithium Niobate, can require 20 KV to reorientate the crystal meaning this is often impractical to perform.

The fraction of light or a mode of light travelling in the waveguide that couples to the Barium Titanate or Rubidium Titanyl Phosphate strip can be controlled by altering the separation between the Barium Titanate or Rubidium Titanyl Phosphate strip and the at least one silicon nitride strip and/or by varying the length of the Barium Titanate or Rubidium Titanyl Phosphate strip. This enables the efficiency of the electro-optical modulation to be traded off against loss dependent upon the application of the waveguide. In some examples, the Barium Titanate or Rubidium Titanyl Phosphate strip is configured to ensure all of the light or mode of light travelling in the waveguide couples to the Barium Titanate or Rubidium Titanyl Phosphate strip. In some examples, this could involve the silicon nitride strip being smaller than the Barium Titanate or Rubidium Titanyl Phosphate strip. This can involve the silicon nitride strip being much smaller than the Barium Titanate or Rubidium Titanyl Phosphate strip. In one non-liming example, the silicon nitride strip being much smaller than the Barium Titanate or Rubidium Titanyl Phosphate strip can involve the silicon nitride strip being up to 20 nm thick and less than 1 μm wide and the Barium Titanate or Rubidium Titanyl Phosphate strip being several 100 nm thick and more than 1 μm wide. The skilled person would understand that these dimensions are exemplary and the silicon nitride strip and Barium Titanate or Rubidium Titanyl Phosphate strip can take other dimensions while still meeting the smaller or much smaller limitation. As such, the light in the waveguide fully decouples from the at least one silicon nitride strip into the Barium Titanate or Rubidium Titanyl Phosphate strip. The light then undergoes a phase shift in the Barium Titanate or Rubidium Titanyl Phosphate strip before being coupled back into the at least one silicon nitride strip. This provides a highly efficient electro-optical modulation and thus requires a relatively low drive voltage. However, this can also increase loss of light. Hence, in other applications, the Barium Titanate or Rubidium Titanyl Phosphate strip can be configured such that only a fraction of the light or mode of light in the waveguide decouples from the at least one silicon nitride strip into the Barium Titanate or Rubidium Titanyl Phosphate strip and is phase shifted before returning to the at least one silicon nitride strip. This reduces the efficiency of the electro-optical modulation but also reduces losses so can be useful for low loss applications.

FIG. 1 shows some example waveguides formed of silicon nitride (e.g. $Si_3N_4$) and silicon dioxide. These waveguides can be known as TriPlex waveguides. Example TriPlex waveguides include the box shell layout, the double-stripe layout, the single-stripe layout, and the filled box layout. Each layout features at least one strip of silicon nitride in a layer/shell/cladding of silicon dioxide. In some examples, the layer/shell/cladding of silicon dioxide can be formed of multiple layers formed using different processes. Each layout can come in a low index contrast version and a high index contrast version.

FIG. 1A shows a box shell layout of TriPlex, this layout comprises a strip of silicon nitride in the form of a box 101, the box-shaped strip of silicon nitride is hollow and has a core of silicon dioxide. The strip of silicon nitride is in a silicon dioxide cladding 102. In an example of a low index contrast version, the box 101 of silicon nitride can have a 1×1 $\mu m^2$ core of silicon dioxide while the box of silicon nitride 101 can be 50 nm thick. In an example of a high index contrast version, the box 101 can have a 0.5×0.5 $\mu m^2$ core while the silicon nitride box 101 can be 170 nm thick.

FIG. 1B shows two possible double-stripe layouts. Each double stripe-layout comprises two strips of silicon nitride in a silicon dioxide layer/shell/cladding 105 wherein each strip takes the form of a stripe. In FIG. 1B(1) the two strips of silicon nitride 103(1), 104(1) are symmetric and have the same width and thickness. The two strips of silicon nitride 103(1), 104(1) are the same length, aligned with one another and spatially separated from one another by the silicon dioxide layer/cladding 105. In an example of a low index contrast version both strips of silicon nitride 103(1), 104(1) can have a thickness of 35 nm, the width of the waveguide can be 1 μm and the separation between the two strips of silicon nitride 103(1), 104(1) can be 500 nm. In an example of a high index contrast version, the strips of silicon nitride 103(1), 104(1) can have a thickness of up to 170 nm, the waveguide width can be 1 μm and the separation between the two strips of silicon nitride 103(1), 104(1) can be 500 nm. In FIG. 1B(2) the two strips of silicon nitride 103(2), 104(2) are asymmetric with a first silicon nitride strip 103(2) having the same width but a different thickness to the second silicon nitride strip 104(2). The two strips of silicon nitride 103(2), 104(2) are the same length, aligned with one another and spatially separated from one another by the silicon dioxide layer/cladding 105. In an example of a low index contrast version, the top strip of silicon nitride 103(2) has a thickness as low as 0 nm, while the bottom strip of silicon nitride 104(2) has a thickness of 75 nm, the waveguide has a width of 1.2 μm and the separation between the top and bottom strip of silicon nitride 103(2), 104(2) is 500 nm. In an example of a high index contrast version, the top strip of silicon nitride 103(2) has a thickness of 175 nm and the bottom strip of silicon nitride 104(2) has a thickness of 70 nm, the waveguide has a width of 0.8 μm and the separation between the two strips of silicon nitride 103(2) 104(2) is 100 nm.

FIG. 1C shows a single-stripe layout. This layout comprises a strip 106 of silicon nitride in a silicon dioxide layer/shell/cladding 107 wherein the strip 106 takes the form of a stripe. The stripe 106 can have a thickness between 20 to 100 μm and the waveguide can have a width between 0.3 and 14 μm.

FIG. 1D shows a filled box layout. This layout comprises a strip of silicon nitride 108 in a silicon dioxide layer/shell/cladding 109 wherein the strip 108 of silicon nitride takes the form of a filled box. The silicon nitride box 108 can have a thickness between 0.8 and 1.2 μm and the waveguide can have a width between 0.8 and 1 μm.

In all examples of FIG. 1, the above dimensions are exemplary, and the skilled person would understand other dimensions in the same range can also be used to form TriPlex waveguides. The skilled person would also understand that the dimensions of the TriPlex waveguides can be in the range between the low index contrast and the high index contrast versions of the waveguides.

In all examples of the Triplex waveguides, the silicon dioxide layer/shell/cladding can be formed of multiple layers of silicon dioxide as is known to someone skilled in the art. For example, the layer of silicon dioxide in which the strip(s) of silicon nitride are formed can be formed using low pressure chemical vapor deposition, the layer of silicon dioxide above the strip(s) can be formed using plasma enhanced chemical vapor deposition, and the base layer can be formed using wet oxidation. However, the skilled person would understand that other methods of forming a TriPlex waveguide are known and can be used as appropriate.

As shown in FIG. 2, and as discussed above, the present application is directed to a phase actuator formed from an optical waveguide, such as a TriPlex optical waveguide. The optical waveguides comprises at least one strip of silicon nitride embedded in a layer of silicon dioxide. The phase actuator comprises the optical waveguide with a strip of Barium Titanate or Rubidium Titanyl Phosphate on or in the optical waveguide. The phase actuator also comprises a signal electrode that is in contact with a first surface of the strip of Barium Titanate or Rubidium Titanyl Phosphate and a ground electrode separate from the signal electrode. The signal electrode and the ground electrode are separated from each other to enable a travelling electrical-magnetic wave to propagate over the length of the waveguide/phase actuator. As the Barium Titanate or Rubidium Titanyl Phosphate is electro-optically active, this electrical-magnetic wave creates or alters the birefringence in the waveguide through the Pockels effect. This leads to a phase change in light propagating in the waveguide enabling the waveguide to be used as a phase actuator. By altering the relative positioning of the strip(s) of silicon nitride and the layer of Barium Titanate or Rubidium Titanyl Phosphate different advantageous examples can be formed.

FIGS. 2A and 2B show example phase actuators where the Barium Titanate or Rubidium Titanyl Phosphate strip 210(A), 210(B) is formed on the waveguide 200(A), 200(B) and, in particular, on the silicon dioxide layer/cladding 220(A), 220(B) of the waveguide. The depicted example can be referred to as having an extended strip of Barium Titanate or Rubidium Titanyl Phosphate 210(A), 210(B) as the Barium Titanate or Rubidium Titanyl Phosphate strip extends along the entire length of the silicon dioxide layer/cladding 220(A), 220(B).

In the examples shown in FIGS. 2A and 2B, the waveguide comprises two strips of silicon nitride 230(A), 240(A), 230(B), 240(B) embedded in the silicon dioxide layer/cladding 220(A), 220(B). The two strips of silicon nitride 230(A), 240(A), 230(B), 240(B) extend only along a partial width of the silicon dioxide layer/cladding 220(A), 220(B). Hence, the silicon dioxide layer/cladding 220(A), 220(B) surrounds the strips of silicon nitride 230(A), 240(A), 230(B), 240(B). The two strips of silicon nitride 230(A), 240(A), 230(B), 240(B) have the same length and are aligned with each other. Thus, the examples shown in FIGS. 2A and 2B can be considered to apply to a double stripe form of TriPlex. However, the skilled person would understand that other forms of TriPlex which comprise only a single strip of silicon nitride can also be used.

As shown in FIGS. 2A and 2B, the strip or layer of Barium Titanate or Rubidium Titanyl Phosphate 210(A), 210(B) is formed on a surface of the silicon dioxide layer/cladding 220(A), 220(B). In other words, the strip or layer of Barium Titanate or Rubidium Titanyl Phosphate 210(A), 210(B) can be considered to be formed on top of the silicon dioxide layer/cladding 220(A), 220(B). The strip or layer of Barium Titanate or Rubidium Titanyl Phosphate 210(A), 210(B) is separated from the silicon nitride strips 230(A), 240(A), 230(B), 240(B) by the silicon dioxide layer/cladding 220(A), 220(B). This separation can be under 15 μm. The separation can result in a lower loss being induced by the Barium Titanate or Rubidium Titanyl Phosphate 210(A), 210(B). However, an increase in separation can lead to a lower electro-optical modulation efficiency. Keeping the separation under 15 μm provides a good tradeoff between loss and electro-optical modulation efficiency. In the examples shown in FIGS. 2A and 2B, the signal and ground electrodes are formed on a first surface of the strip or layer of Barium Titanate or Rubidium Titanyl Phosphate 210(A), 210(B) wherein the first surface of the strip or layer of Barium Titanate or Rubidium Titanyl Phosphate 210(A), 210(B) is an opposing surface to the surface of the strip or layer of Barium Titanate or Rubidium Titanyl Phosphate 210(A), 210(B) that is connected/attached/formed on the silicon dioxide layer/cladding 220(A), 220(B) of the waveguide 200(A), 200(B). As discussed in more detail later, the strip or layer of Barium Titanate or Rubidium Titanyl Phosphate 210(A), 210(B) can be connected/attached/formed on the silicon dioxide layer/cladding 220(A), 220(B) via a bonding layer 270(A), 270(B).

In the example shown in FIG. 2A, the electrodes are left exposed. However, as shown in FIG. 2B an additional layer of silicon dioxide 250(B) can be formed around or on the signal and ground electrodes to also encase the electrodes. This can be referred to as a silicon dioxide cover layer. In some examples the additional layer of silicon dioxide 250(B) can be between 10 nm and 1 μm.

In FIGS. 2A and 2B, the strip or layer of Barium Titanate or Rubidium Titanyl Phosphate 210(A), 210(B) extends across the entire length of the silicon dioxide layer/cladding 220(A), 220(B). This increases the fraction of the optical mode travelling in the waveguide 200(A), 200(B) that are transferred to the Barium Titanate or Rubidium Titanyl Phosphate strip or layer 210(A), 210(B) which has the advantage that a larger fraction of the mode of light travelling the waveguide 200(A), 200(B) enters the layer or strip of Barium Titanate or Rubidium Titanyl Phosphate 210(A), 210(B) which increases the electro-optical modulation efficiency and thus the phase actuator to be used at a lower operating voltage.

The strip of Barium Titanate or Rubidium Titanyl Phosphate 210(A), 210(B) can have a width of under 5 μm. This can prevent large optical losses.

The signal and ground electrodes may be formed on the Barium Titanate or Rubidium Titanyl Phosphate layer/strip 210(A), 210(B) in any suitable arrangement. However, FIGS. 2A and 2B show an example arrangement of electrodes which may be used. In particular, FIGS. 2A and 2B show a central ground electrode 260(A), 260(B), that in some examples can have a length the same as the length of the strips of silicon nitride 230(A), 240(A), 230(B), 240(B). On each side of the central ground electrode 260(A), 260(B), a signal electrode 261(A), 262(A), 261(B), 262(B) is formed. These can have a length of under 20 μm and can be separated from the central ground electrode 260(A), 260(B) by a distance of under 10 μm. Finally, on the opposite side of each signal electrode 261(A), 262(A), 261(B), 262(B) to the central ground electrode 260(A), 260(B), an outer ground electrode 263(A), 264(A), 263(B), 264(B) is positioned. These can also have a length of under 20 μm and be separated from the nearest signal electrode 261(A), 262(A), 261(B), 262(B) by a distance of under 10 μm. In the examples shown in FIGS. 2A and 2B, the outer ground electrode is aligned with the edge of the silicon dioxide layer/cladding 220(A), 220(B). However, this is merely exemplary and should not be considered limiting. This arrangement of electrodes provides a simple fabrication that does not require any additional processing of the silicon dioxide layer/cladding 220(A), 220(B) or subsequent depositions to make the silicon dioxide layer/cladding 220(A), 220(B) thicker. The signal and ground electrodes 260(A), 261(A), 262(A), 263(A), 264(A), 260(B), 261(B), 262(B), 263(B), 264(B) can be formed for any suitable material, examples of such suitable materials include titanium (Ti), gold (Au) and platinum (Pt).

FIGS. 2C and 2D show further examples of a phase actuator where the strip/layer of Barium Titanate or Rubidium Titanyl Phosphate 210(C), 210(D) is formed on the silicon dioxide layer/cladding 220(C), 220(D). However, in this example, the strip/layer of Barium Titanate or Rubidium Titanyl Phosphate 210(C), 210(D) extends along only a part of the length of the silicon dioxide layer/cladding 220(C), 220(D). This reduces the fraction of the optical mode in the waveguide 200(C), 200(D) that is transferred into the Barium Titanate or Rubidium Titanyl Phosphate 210(C), 210(D) strip/layer. This has advantages since it can reduce optical loss.

As with FIGS. 2A and 2B, the waveguide 200(C), 200(D) shown in FIGS. 2C and 2D comprises two strips of silicon nitride 230(C), 240(C), 230(D), 240(D) embedded in the silicon dioxide layer/cladding 220(C), 220(D) wherein the two strips of silicon nitride 230(C), 240(C), 230(D), 240(D)

are spatially separated from each other and do not extend along the entire length of the silicon dioxide layer/cladding 220(C), 220(D). The two strips of silicon nitride 230(C), 240(C), 230(D), 240(D) are of the same length and are aligned with each other. As such, the waveguides 200(C), 200(D) in FIGS. 2C and 2D can be considered to be two stripe TriPlex waveguides. However, the skilled person would understand this is purely exemplary and other forms of TriPlex waveguide, discussed above, can also be used.

In the examples shown in FIGS. 2C and 2D, the strip/layer of Barium Titanate or Rubidium Titanyl Phosphate is formed/positioned on a surface of the silicon dioxide layer/cladding 220(C), 220(D) and is spatially separated from the silicon nitride strips 230(C), 240(C), 230(D), 240(D). The length of the Barium Titanate or Rubidium Titanyl Phosphate strip/layer 210(C), 210(D) can be substantially the same as the length of the strips of silicon nitride 230(C), 240(C), 230(D), 240(D) and the strip/layer of Barium Titanate or Rubidium Titanyl Phosphate 210(C), 210(D) can be positioned substantially above the strips of silicon nitride 230(C), 240(C), 230(D), 240(D). The strip/layer of Barium Titanate or Rubidium Titanyl Phosphate 210(C), 210(D) can have a width/height of under 5 μm. While a thicker/taller strip/layer of Barium Titanate or Rubidium Titanyl Phosphate 210(C), 210(D) can increase the electro-optical modulation efficiency, this can also lead to increased loss. Limiting the width/height of the strip/layer of Barium Titanate or Rubidium Titanyl Phosphate 210(C), 210(D) to under 5 μm can provide a good tradeoff between the electro-optical modulation efficiency and loss.

While the length of the Barium Titanate or Rubidium Titanyl Phosphate strip/layer 210(C), 210(D) can be substantially the same as the length of the strips of silicon nitride 230(C), 240(C), 230(D), 240(D), the skilled person would understand that the length of the Barium Titanate or Rubidium Titanyl Phosphate strip/layer 210(C), 210(D) can be reduced or extended as appropriate to alter the fraction of the optical mode in the waveguide 200(C), 200(D) that is transferred into the strip/layer Barium Titanate or Rubidium Titanyl Phosphate 210(C), 210(D). In particular, by increasing the length of the Barium Titanate or Rubidium Titanyl Phosphate strip/layer 210(C), 210(D), it is possible to increase the fraction of the optical mode that is transferred from the waveguide 200(C), 200(D) into the Barium Titanate or Rubidium Titanyl Phosphate strip/layer 210(C), 210(D). This increases the electro-optical modulation efficiency and hence reduces the required operating volt as it exposes more of the optical mode to the birefringence in the Barium Titanate or Rubidium Titanyl Phosphate strip/layer 210(C), 210(D). However, this can come at the expense of increase optical loss. Hence, in some examples a shorter length of Barium Titanate or Rubidium Titanyl Phosphate strip/layer 210(C), 210(D) is preferable.

As the length of the strip/layer of Barium Titanate or Rubidium Titanyl Phosphate 210(C), 210(D) is reduced in FIGS. 2C and 2D, an alternative arrangement of electrodes can be used compared to the examples in FIGS. 2A and 2B. For example, as shown in FIGS. 2C and 2D, a signal electrode 261(C), 261(D) can be formed on a first side/surface of the Barium Titanate or Rubidium Titanyl Phosphate strip/layer 210(C), 210(D) wherein the first side/surface of the strip/layer of Barium Titanate or Rubidium Titanyl Phosphate 210(C), 210(D) is an opposing surface to the side/surface of the strip/layer of Barium Titanate or Rubidium Titanyl Phosphate 210(C), 210(D) interfacing with the silicon dioxide layer/cladding 220(C), 220(D). A ground electrode 260(C), 260(D) can then be formed on a second surface/side of the Barium Titanate or Rubidium Titanyl Phosphate 210(C), 210(D) strip/layer wherein the second surface is an opposing surface to the first surface and is the surface of the Barium Titanate or Rubidium Titanyl Phosphate strip/layer 210(C), 210(D) that interfaces with the silicon dioxide layer/cladding 220(C), 220(D). Hence, the ground electrode 260(C), 260(D) can be formed in the silicon dioxide layer/cladding 220(C), 220(D). In the examples shown in FIGS. 2C and 2D, the signal electrodes 260(C), 261(C), 260(D), 261(D) extend across the entire length of the strip/layer of Barium Titanate or Rubidium Titanyl Phosphate 210(C), 210(D). However, the skilled person would understand this is purely exemplary and other lengths of electrodes can be used. This arrangement of electrodes allows phase shifter with a strip/layer of Barium Titanate or Rubidium Titanyl Phosphate 210(C), 210(D) wherein the phase shifters take the form of a capacitor. The signal and ground electrodes 260(C), 261(C), 260(D), 261(D) can have a width/height of under 5 μm. The separation between the silicon nitride strip 230(C), 230(D) nearest the Barium Titanate or Rubidium Titanyl Phosphate strip/layer 210(C), 210(D) and the Barium Titanate or Rubidium Titanyl Phosphate strip/layer 210(C), 210(D) can be under 15 μm.

As in FIG. 2B, in FIG. 2D, the phase actuator comprises a silicon dioxide cover layer 250(D) that ensures the silicon dioxide layer/cladding 220(D) encases the electrodes including the signal electrode 261(D). In some examples, this cover layer can be between 10 nm and 1 μm thick. The cover layer can provide reduced optical loss and simplifies the RF (radio frequency) design since there is no layer of air, so the layer of air does not need to be taken into account during RF design. This enables more flexible arrangements of electrodes. However, the skilled person would understand that the cover layer 250(D) is one example and, in the example, shown in FIG. 2C, no cover layer is present and the Barium Titanate or Rubidium Titanyl Phosphate strip/layer 210(C) and the signal electrode 261(C) are left exposed. In the example shown in FIG. 2C, the ground electrode 260(C) is embedded in the silicon dioxide layer/cladding 220(C). However, in other examples, this can also be left exposed.

FIG. 2E shows an alternative arrangement for a phase actuator. In particular, in the examples shown in FIGS. 2A through to 2D above, the Barium Titanate or Rubidium Titanyl Phosphate strip/layer 210(A)-210(D) is formed on the silicon dioxide layer/cladding 220(A)-220(D) and is separated from the strips of silicon nitride 230(A)-230(D) and 240(A)-240(D). This arrangement reduces the amount of light that enters the Barium Titanate or Rubidium Titanyl Phosphate strip/layer 210(A)-210(D) and hence the optical losses. However, in other examples, it can be beneficial to form the Barium Titanate or Rubidium Titanyl Phosphate strip/layer on one of the silicon nitride strips. This leads to increased electro-optical modulation efficiency which reduces the required operating voltages. An example of this is shown in FIG. 2E.

FIG. 2E shows an arrangement corresponding to FIG. 2A where the strip/layer of Barium Titanate or Rubidium Titanyl Phosphate interfaces with one of the strips of silicon nitride 230(E). As with FIGS. 2A-2D, the waveguide 200(C) comprises two strips of silicon nitride 230(E), 240(E) embedded in a silicon dioxide layer/cladding 220(E). The two strips of silicon nitride 230(E), 240(E) are of the same length and do not extend across the entire length of the silicon dioxide layer/cladding 220(E). The two strips of silicon nitride 230(E), 240(E) are spatially separated from each other and are aligned with each other. A first silicon nitride strip 230(E) of the two silicon nitride strips 230(E), 240(E) is formed so it has a surface aligned with a surface of the silicon dioxide layer/cladding 220(E). Hence, a surface of the first silicon nitride strip 230(E) is exposed before formation of the Barium Titanate or Rubidium Titanyl Phosphate strip/layer 210(E). The Barium Titanate or Rubidium Titanyl Phosphate strip/layer 210(E) interfaces with the first silicon nitride strip 230(E) along the length of the surface of the silicon nitride strip 230(E). As described later, this interface may be via a bonding layer 270(E). In the example shown in FIG. 2E, the Barium Titanate or Rubidium Titanyl Phosphate strip/layer 201(E) extends along the entire length of the silicon dioxide layer/cladding 220(E) and hence the entire length of the waveguide 200(E). As such, as well as interfacing with the silicon nitride strip 230(E), the Barium Titanate or Rubidium Titanyl Phosphate strip/layer interfaces with the layer of the silicon dioxide layer/cladding 220(E) on either side of the first silicon nitride strip 230(E). However, the skilled person would understand that in other examples a shorter layer/strip of Barium Titanate or Rubidium Titanyl Phosphate could be used. In addition, in the example shown in FIG. 2E, there is no cover layer or additional layer of silicon dioxide covering the top surface of the Barium Titanate or Rubidium Titanyl Phosphate strip/layer 210(E) and the electrodes 260(E), 261(E), 262(E), 263(E), 264(E). However, the skilled person would understand that in other examples such a cover layer could be present.

As discussed above, in the example shown in FIG. 2E, the strip/layer of Barium Titanate or Rubidium Titanyl Phosphate 210(E) interfaces (potentially via bonding layer 270 (E)) with the first silicon nitride strip 230(E). Hence, the electrodes 260(E)-264(E) are positioned on a first side/surface of the strip/layer of Barium Titanate or Rubidium Titanyl Phosphate 210(E) that is an opposing side/surface of the strip/layer of Barium Titanate or Rubidium Titanyl Phosphate 210(E) to the one interfacing with the first silicon nitride strip 230(E). The electrodes 260(E)-264(E) comprise at least one signal electrode and at least one ground electrode wherein the signal electrode and ground electrode are spatially separated from one another. In the specific example shown in FIG. 2E, the electrodes comprise a central ground electrode 260(E) with a signal electrode 261(E), 262(E) on either side. Each signal electrode 261(E), 262(E) has a further ground electrode 263(E), 264(E) on the side opposite to the central ground electrode 260(E). The dimensions of the electrodes can be the same as discussed with respect to FIGS. 2A and 2B above. However, the skilled person would understand other suitable arrangements of electrodes could be used.

In the examples shown in FIGS. 2A through to 2E, the strip/layer of Barium Titanate or Rubidium Titanyl Phosphate is formed on the waveguide 200(A) to 200(E). This enables a simple fabrication. However, in other examples, the strip of Barium Titanate or Rubidium Titanyl Phosphate can be formed in the waveguide. This enables more versatile arrangements of the strip/layer of Barium Titanate or Rubidium Titanyl Phosphate and the silicon dioxide/layer cladding and silicon nitride strips.

FIGS. 2F and 2G show examples where the strip of Barium Titanate or Rubidium Titanyl Phosphate comprises two strips of Barium Titanate or Rubidium Titanyl Phosphate 210(F), 215(F), 210(G), 215(G) formed in the silicon dioxide layer/cladding 220(F), 220(G) on either side of the two strips of silicon nitride 230(F), 240(F), 230(G), 240(G). As with the above examples, in FIGS. 2F and 2G, the waveguide 200(F), 200(G) comprises two strips of silicon nitride 230(F), 240(F), 230(G), 240(G) embedded in a silicon dioxide layer/cladding 220(F), 220(G). The two strips of silicon nitride 230(F), 240(F), 230(G), 240(G) are of equal length and do not extend across the entire length of the silicon dioxide layer/cladding 220(F), 220(G). The two strips of silicon nitride 230(F), 240(F), 230(G), 240(G) are spatially separated from each other and are surrounded by the silicon dioxide layer/cladding 220(F), 220(G). As mentioned above, in the examples shown in FIGS. 2F and 2G, two strips of Barium Titanate or Rubidium Titanyl Phosphate 210(F), 215(F), 210(G), 215(G) are formed in the silicon dioxide layer/cladding 220(F), 220(G) on either side of the two strips of silicon nitride 230(F), 240(F), 230(G), 240(G). A first side/surface of each strip of Barium Titanate or Rubidium Titanyl Phosphate 210(F), 215(F), 210(G), 215(G) is aligned with a side/surface of the silicon dioxide layer/cladding 220(F), 220(G). A second opposing side/surface of each strip of Barium Titanate or Rubidium Titanyl Phosphate 210(F), 215(F), 210(G), 215(G) is below the first surface and embedded in the silicon dioxide layer/cladding 220(F), 220(G).

FIGS. 2F and 2G show examples of how electrodes can be arranged when the Barium Titanate or Rubidium Titanyl Phosphate strips 210(F), 215(F), 210(G), 215(G) are embedded in the silicon dioxide layer/cladding 220(F), 220(G). In both examples, a signal electrode 261(F), 262(F), 261(G), 262(G) is formed on the first side/surface of each Barium Titanate or Rubidium Titanyl Phosphate strip 210(F), 215 (F), 210(G), 215(G) wherein the first side/surface of each Barium Titanate or Rubidium Titanyl Phosphate strip 210 (F), 215(F), 210(G), 215(G) is the side/surface aligned with the side/surface of the silicon dioxide layer/cladding 220(F), 220(G). In the example shown in FIG. 2E, the ground electrode is formed of three ground electrodes all formed on the side/surface of the silicon dioxide layer/cladding 220(F). A central ground electrode 260(F) is formed between on the side/surface of the silicon dioxide layer/cladding 220(F) between the signal electrodes 261(F), 262(F) formed on the Barium Titanate or Rubidium Titanyl Phosphate strips 210 (F), 215(F). Further ground electrodes 263(F), 264(F) are then formed on the silicon dioxide layer/cladding 220(F) on the opposite side of each signal electrode 261(F), 262(F) to the central ground electrode 260(F). Thus, this arrangement of electrodes is similar to that shown in FIGS. 2A, 2B and 2F. In the example shown in FIG. 2F, a ground electrodes 260(G) and 263(G) is formed on a second surface of each Barium Titanate or Rubidium Titanyl Phosphate strip 210 (G), 215(G) wherein the second surface of each Barium Titanate or Rubidium Titanyl Phosphate strip 210(G), 215 (G) is an opposing/opposite surface to the first surface of each Barium Titanate or Rubidium Titanyl Phosphate strip 210(G), 215(G). As such, the ground electrodes 260(G), 263(G) are embedded in the silicon dioxide layer/cladding 220(G). Although FIGS. 2F and 2G do not depict a silicon dioxide cover layer, the skilled person would understand that such a layer can be present in some examples.

In FIGS. 2A through to 2G, the strip/layer of Barium Titanate or Rubidium Titanyl Phosphate is shown formed on a bonding layer 270(A)-270(G). The bonding layer can have a thickness of 1 to 2 atomic layers and can be formed of $SrTiO_3$, $Gd_3Ga_5O_{12}$, or $Y_3Fe_5O_{12}$. The bonding layer enables the Barium Titanate or Rubidium Titanyl Phosphate to be formed on the silicon dioxide layer/cladding 220(A)-220(H) using epitaxial growth or any other suitable method. This ensures the ease of fabrication of the phase actuator. In the examples shown in FIGS. 2C, 2D and 2G where the ground electrodes 260(C), 260(D), 260(G), 263(G) are embedded in the silicon dioxide layer/cladding 220(C), 220(D), 220(G), the bonding layer 270(C) 270(D), 270 (G) can be between the ground electrodes 260(C), 260(D), 260(G), 263(G) and the strip/layer of Barium Titanate or Rubidium Titanyl Phosphate 210(C), 210(D), 210(F), 215 (F), 210(G), 215(G). Once again, this increases the ease of fabrication of the phase actuator.

In the examples described above, the signal and ground electrodes can be formed of any suitable material. In some examples, the signal and ground electrodes can be formed from titanium (Ti), gold (Au) or platinum (Pt). However, any other suitable material could be used.

The above examples are shown with respect to a waveguide 200(A)-200(G) comprising two strips of silicon nitride 230(A)-230(G), 240(A)-240(G) embedded in a silicon dioxide layer/cladding 220(A)-220(G). Hence, the above examples could be considered to apply to a waveguide 200(A)-200(G) that can be referred to as a two-stripe TriPlex waveguide. However, the skilled person would understand the arrangement of Barium Titanate or Rubidium Titanyl Phosphate strips 210(A)-210(G) shown could also be used with other waveguides that can be considered TriPlex waveguides such as the box shell, single stripe and filled box arrangements discussed above with respect to FIG. 1.

The fraction of the optical mode of light in the waveguide 200(A)-200(G) that is coupled into the strip/layer of Barium Titanate or Rubidium Titanyl Phosphate 210(A)-210(G) depends on both the length of the Barium Titanate or Rubidium Titanyl Phosphate strip/layer and the distance of the Barium Titanate or Rubidium Titanyl Phosphate strip/layer 210(A)-210(G) from the strip(s) of silicon nitride 230(A)-230(G). In some examples, the phase actuator can be configured to enable all of the light in the waveguide 200(A)-200(G) to decouple from the waveguide 200(A)-200 (G) into the Barium Titanate or Rubidium Titanyl Phosphate strip/layer 210(A)-210(G) in which the light undergoes an electro-optical phase shift. The light then couples back into the silicon nitride strip(s) 230A(A)-230(G) of the waveguide 200(A)-200(G). This provides efficient electro-optical modulation and enables a lower operating voltage to be used. However, in other examples, it may be beneficial to trade off the efficiency of electro-optical modulation for reduced loss by reducing the fraction of the optical mode of light in the waveguide 200(A)-200(G) that is coupled into the strip/layer of Barium Titanate or Rubidium Titanyl Phosphate 210(A)-210(G). This can be done by decreasing the length of the strip/layer of Barium Titanate or Rubidium Titanyl Phosphate 210(A)-210(G) or increasing the separation between the Barium Titanate or Rubidium Titanyl Phosphate strip/layer 210(A)-210(G) and the strip(s) of silicon nitride 230(A)-230(G). By controlling the length of the Barium Titanate or Rubidium Titanyl Phosphate strip/layer 210(A)-210(G) and the separation of the Barium Titanate or Rubidium Titanyl Phosphate strip/layer 210(A)-210(G) from the from the silicon nitride strip(s) 230(A)-230 (G), the phase actuator can be designed, depending on the purpose of the phase actuator to either have a more efficient electro-optical modulation (thus reducing the required operating voltage) or lower losses. The varying of the length of the Barium Titanate or Rubidium Titanyl Phosphate strip/layer 210(A)-210(G) and the separation of the Barium Titanate or Rubidium Titanyl Phosphate strip/layer 210(A)-210(G) from the silicon nitride strip(s) 230A-230G can thus be adjusted as required depending on the function of the phase actuator. As discussed above, the present application relates to a silicon nitride/silicon dioxide waveguide supplemented with at least one strip of Barium Titanate or Rubidium Titanyl Phosphate. The use of Barium Titanate or Rubidium Titanyl Phosphate, as opposed to other electro-optically active materials such as Lithium Niobate has the advantage that the Barium Titanate or Rubidium Titanyl Phosphate can be formed directly on the silicon nitride/silicon dioxide waveguide. In addition, Barium Titanate and Rubidium Titanyl Phosphate have a relatively low operating voltage (2V to 4V) enabling the phase actuator to be used at low power and ensuring the cryogenic compatibility of the phase actuator.

FIG. 3 is a flowchart showing a method 300 for forming a phase actuator in accordance with the examples described above.

In step 310, the method comprises forming an optical waveguide comprising at least one silicon nitride strip embedded in a silicon dioxide layer/cladding. Such waveguides can be known as TriPlex waveguides and the skilled person would be familiar with methods of forming such waveguides. For example, the waveguide can be formed by forming a bottom of the silicon dioxide cladding on a silicon substate using wet oxidation. The method can then comprise forming a first strip of silicon nitride using low pressure chemical vapor deposition. If more than one silicon nitride strip is used, an intermediate layer of silicon dioxide can be formed using TEOS (Tetraethyl orthosilicate) low pressure chemical vapor deposition before forming the second silicon nitride strip using low pressure chemical vapor deposition. The strips of silicon nitride can be patterned using dry etch and resist removal. A top cladding of silicon dioxide can then be formed using TEOS low pressure chemical vapor deposition. Any additional silicon dioxide cladding required can be formed using plasma enhanced chemical vapor deposition. The skilled person would understand that other methods of forming the silicon nitride/silicon dioxide waveguide are also suitable.

In step 320, the method can comprise forming a bonding layer on at least one surface of the optical waveguide. The bonding layer can be formed using epitaxial growth or any other suitable method. The bonding layer comprises at least one of $SrTiO_3$, $Gd_3Ga_5O_{12}$, $Y_3Fe_5O_{12}$ and is 1 to 2 atomic layers thick. This ensures the bonding layer does not significantly impact the functioning of the waveguide or the strip of Barium Titanate or Rubidium Titanyl Phosphate, while ensuring the Barium Titanate or Rubidium Titanyl Phosphate can be formed on the waveguide. In some examples, the bonding layer is formed in/on the silicon dioxide cladding/layer. In other examples, the bonding layer is formed on one of the silicon nitride strips. In these examples, the bonding layer can then extend beyond the silicon nitride strip and along the silicon dioxide cladding/layer.

In some examples, an intermediate step is included between forming the waveguide and forming the bonding layer. This intermediate step can comprise etching the silicon dioxide cladding/layer to form a space for the Barium Titanate or Rubidium Titanyl Phosphate. This intermediate step can be used, for example, when forming phase actuators in accordance with the examples shown in FIGS. 2F and 2G above.

In step 330, the method comprises growing a strip of Barium Titanate or Rubidium Titanyl Phosphate on the bonding layer. The strip of Barium Titanate or Rubidium Titanyl Phosphate can be grown using epitaxial growth or any other suitable method. The strip of Barium Titanate or Rubidium Titanyl Phosphate can be under 5 μm wide/heigh. The length of the Barium Titanate or Rubidium Titanyl Phosphate strip can be between the length of the silicon nitride strips and the length of the silicon dioxide layer/cladding with the length being chosen to control the fraction of the mode of light travelling in the waveguide that enters the Barium Titanate or Rubidium Titanyl Phosphate strip. In some examples, the length of the bonding layer is chosen to the same as the length of the Barium Titanate or Rubidium Titanyl Phosphate strip.

In step 340, the method comprises, forming a signal electrode on a first surface of the strip of Barium Titanate or Rubidium Titanyl Phosphate. The signal electrode can be formed using any suitable process such as sputter decomposition or evaporation combined with lithography and etching. The first surface of the strip of Barium Titanate or Rubidium Titanyl Phosphate is the opposing/opposite surface to the surface of the strip of Barium Titanate or Rubidium Titanyl Phosphate that interfaces with the waveguide via the bonding layer.

In step 350, the method further comprises forming a ground electrode. The ground electrode can be formed using any suitable process such as sputter decomposition or evaporation combined with lithography and etching. ground electrode can be formed in several different positions depending upon the desired arrangement of the Barium Titanate or Rubidium Titanyl Phosphate and waveguide. In examples where the Barium Titanate or Rubidium Titanyl Phosphate strip extends across the entire length of the silicon dioxide layer, irrespective of whether the Barium Titanate or Rubidium Titanyl Phosphate strip also interfaces with the silicon nitride strip, the ground electrode can be formed on the first surface of the strip of Barium Titanate or Rubidium Titanyl Phosphate in arrangements as discussed with respect to FIGS. 2A, 2B, and 2E. In contrast, in arrangements where the Barium Titanate or Rubidium Titanyl Phosphate strip is of limited length, for example being the same length as the silicon nitride strip(s) then the ground electrode can be formed on a second side of the Barium Titanate or Rubidium Titanyl Phosphate strip wherein the second side of the Barium Titanate or Rubidium Titanyl Phosphate strip is the opposing/opposite side to the first side of the Barium Titanate or Rubidium Titanyl Phosphate strip. In examples where there are two Barium Titanate or Rubidium Titanyl Phosphate strips formed in the silicon dioxide layer/cladding such as those shown in FIGS. 2F and 2G, then a ground electrode can either be formed on a second opposing side of each Barium Titanate or Rubidium Titanyl Phosphate strip or on the silicon dioxide layer/cladding itself.

In some examples, the method can comprise a further optional step of forming a silicon dioxide cover layer over any exposed electrodes or parts of the Barium Titanate or Rubidium Titanyl Phosphate strip. This silicon dioxide cover lay can be formed using plasma enhanced chemical vapor decomposition (PECVD), low-pressure chemical vapor decomposition (LPCVD) or any other suitable process. The cover layer can be between 10 nm and 1 μm. This cover layer can protect the Barium Titanate or Rubidium Titanyl Phosphate strip from being exposed.

In summary, the present application relates to a phase actuator formed from a waveguide formed of at least one strip of silicon nitride strip embedded in a silicon dioxide layer/cladding. Such waveguides can be known as TriPlex waveguides. The phase actuator also comprises a layer or strip of Barium Titanate or Rubidium Titanyl Phosphate formed on or in the waveguide. The layer or strip of Barium Titanate or Rubidium Titanyl Phosphate is electro-optically active and enables the waveguide to function as an electro-optically modulated phase actuator. The fact that a silicon nitride/silicon dioxide waveguide is used means that the resultant phase actuator has low losses such as less than 1 dB and even down to 0.1 dB since silicon nitride/silicon dioxide waveguides have been shown to have losses down to $5\times10^{-4}$ dB/cm. In addition, the fact the phase actuator is electro-optically modulated means the phase actuator has higher reconfiguration rates, a smaller footprint and lower cross talk than thermal and MEMS phase actuators. In addition, using Barium Titanate or Rubidium Titanyl Phosphate as the electro-optically active material has advantages since Barium Titanate or Rubidium Titanyl Phosphate functions at a low operating voltage meaning the phase actuator has a low power consumption and the electro-optically active material is cryogenically compatible with the waveguide. Barium Titanate or Rubidium Titanyl Phosphate is also advantageous since it can be grown in situ on the silicon dioxide or silicon nitride meaning it can be formed in place enabling high-scale on-chip integration.

Phase actuators in accordance with the present application can be useful for multiple purposes. For example, such phase actuators can be used for switching, in phase shifters and in multiplexers. In addition, the low optical loss combined with the low driving voltage means that the phase actuators are particularly suited for optical quantum computing and optical quantum communication applications. Therefore, in some examples, the present application is also directed to a photonic processor comprising phase actuators as discussed above.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

What is claimed is:

1. A phase actuator comprising:

an optical waveguide wherein the optical waveguide comprises at least one strip of silicon nitride embedded in a layer of silicon dioxide;

a first strip of material on or in the optical waveguide wherein the first strip of material comprises a material that is electro-optically active and acts as an electro-optical modulator;

a second strip of material wherein the second strip of material comprises an electro-optical modulator;

a signal electrode in contact with a first surface of the first strip of material;

a second signal electrode in contract with a first surface of the second strip of material; and a ground electrode separated from the signal electrode, wherein the signal electrode and the ground electrode are positioned to allow a travelling electro-magnetic wave to propagate over a length of the phase actuator, wherein the first strip of material is embedded in the layer of silicon dioxide on a first lateral side of the at least one strip of silicon nitride;

the second strip of material is embedded in the layer of silicon dioxide on a second lateral side of the at least one strip of silicon nitride, wherein the first lateral side and the second lateral side of the at least one strip of silicon nitride are opposite sides lateral of the at least one strip of silicon nitride.

2. The phase actuator of claim 1, wherein the first strip of material comprises a strip of Barium Titanate or a strip of Rubidium Titanyl Phosphate.

3. The phase actuator of claim 1 wherein:

the waveguide is a TriPlex waveguide.

4. The phase actuator of claim 1 wherein:

the at least one strip of silicon nitride comprises a first and second strip of silicon nitride embedded in the layer of silicon dioxide;

wherein the first and second strip of silicon nitride are of the same length as each other and do not extend across an entire length of the layer of silicon dioxide and the first and second strip of silicon nitride are separated from each other by the layer of silicon dioxide and are aligned with each other.

5. The phase actuator of claim 1 further comprising:

a bonding layer between the optical waveguide and the first strip of material wherein the bonding layer comprises $SrTiO_3$, $Gd_3Ga_5O_{12}$, $Y_3Fe_5O_{12}$.

6. The phase actuator of claim 1 wherein:

the ground electrode is in contract with a second surface of the first strip of material, wherein the first and second surface of the first strip of material are opposing surfaces.

7. The phase actuator of claim 6, wherein:

the ground electrode, the first strip of material, and the signal electrode are embedded in the layer of silicon dioxide.

8. The phase actuator of any of claim 6 wherein the signal electrode, the first strip of material and the ground electrode extend along only a portion of the layer of silicon dioxide.

9. The phase actuator of claim 1 wherein:

the ground electrode is a first ground electrode;

the first ground electrode is in contact with a second surface of the first strip of material, wherein the first surface and second surface of the strip of material are opposing surfaces; and the phase actuator further comprises:

a second ground electrode wherein the second ground electrode is in contact with a second surface of the second strip of material, wherein the first surface and second surface of the strip of material are opposing surfaces.

10. The phase actuator of claim 9, wherein the first ground electrode and the second ground electrode are embedded in the silicon dioxide layer.

11. The phase actuator of claim 10, wherein the first surface of the first strip of material and the first surface of the second strip of material are aligned with a surface of the silicon dioxide layer.

12. The phase actuator of claim 11 further comprising:

a silicon dioxide cover layer that encases the first and second signal electrodes.

13. The phase actuator of claim 1 wherein the ground electrode is in contact with a surface of the silicon dioxide layer.

14. The phase actuator of claim 1, wherein the ground electrode comprises three electrodes and wherein:

the three ground electrodes are on the surface of the silicon dioxide layer;

a central ground electrode of the three ground electrodes is on the surface of the silicon dioxide layer between the signal electrode and the second signal electrode; and the second and third ground electrodes of the three ground electrodes are on the surface of the silicon dioxide layer on opposite sides of the first and second signal electrode respectively to the central ground electrode.

15. The phase actuator of claim 1, wherein the first surface of the first strip of material and the first surface of the second strip of material are aligned with a surface of the silicon dioxide layer.

16. The phase actuator of claim 15 further comprising:

a silicon dioxide cover layer that encases the first and second signal electrodes and the ground electrode.

17. The phase actuator of claim 1 wherein the silicon nitride strip is a strip of $Si_3N_4$.

18. The phase actuator of claim 1, wherein the layer of silicon dioxide comprises a silicon dioxide cladding.

* * * * *